(12) United States Patent
Cho et al.

(10) Patent No.: US 8,026,016 B2
(45) Date of Patent: Sep. 27, 2011

(54) POLYMER ELECTROLYTE MEMBRANE AND FUEL CELL EMPLOYING THE SAME

(75) Inventors: Myung-dong Cho, Hwaseong-si (KR); Hee-young Sun, Yongin-si (KR); Myung-jin Lee, Yongin-si (KR)

(73) Assignee: Samsung SDI Co., Ltd., Suwon (KR)

( * ) Notice: Subject to any disclaimer, the term of this patent is extended or adjusted under 35 U.S.C. 154(b) by 1305 days.

(21) Appl. No.: 11/150,183

(22) Filed: Jun. 13, 2005

(65) Prior Publication Data

US 2006/0046134 A1 Mar. 2, 2006

(30) Foreign Application Priority Data

Aug. 31, 2004 (KR) .................. 10-2004-0069091

(51) Int. Cl.
*H01M 8/10* (2006.01)
(52) U.S. Cl. .................. 429/491; 429/479; 429/492
(58) Field of Classification Search .................. 429/129, 429/309, 315
See application file for complete search history.

(56) References Cited

U.S. PATENT DOCUMENTS

| | | | |
|---|---|---|---|
| 5,096,561 A | | 3/1992 | Akhtar |
| 5,451,476 A * | | 9/1995 | Josefowicz .................. 429/213 |
| 5,985,942 A | | 11/1999 | Steck et al. |
| 6,218,035 B1 * | | 4/2001 | Fuglevand et al. .............. 429/30 |
| 6,248,469 B1 | | 6/2001 | Formato et al. |
| 6,258,276 B1 | | 7/2001 | Mika et al. |
| 6,395,429 B1 * | | 5/2002 | Kang et al. .................... 429/306 |
| 6,444,343 B1 | | 9/2002 | Prakash et al. |
| 6,468,595 B1 | | 10/2002 | Mikhael et al. |
| 7,288,309 B2 | | 10/2007 | Fleming et al. |
| 7,344,791 B1 * | | 3/2008 | Yamaguchi et al. ............. 429/30 |
| 2002/0045085 A1 * | | 4/2002 | Formato et al. ................. 429/33 |
| 2002/0127474 A1 | | 9/2002 | Fleischer et al. |
| 2002/0144899 A1 * | | 10/2002 | Arcella et al. ................. 204/296 |
| 2002/0156142 A1 | | 10/2002 | Mikhael et al. |
| 2003/0168404 A1 | | 9/2003 | Mika et al. |
| 2005/0003255 A1 * | | 1/2005 | Shimizu et al. ................. 429/30 |
| 2009/0297909 A1 | | 12/2009 | Yamamoto et al. |

FOREIGN PATENT DOCUMENTS

| | | |
|---|---|---|
| CN | 1114237 | 1/1996 |
| CN | 1371934 | 10/2002 |
| CN | 101069313 | 11/2007 |
| EP | 1 238 999 A1 | 9/2002 |

(Continued)

OTHER PUBLICATIONS

European Search Report dated Oct. 12, 2005.

(Continued)

*Primary Examiner* — Patrick Joseph Ryan
*Assistant Examiner* — Muhammad Siddiquee
(74) *Attorney, Agent, or Firm* — H.C. Park & Associates, PLC

(57) ABSTRACT

The present invention relates to a polymer electrolyte membrane that includes a porous polymer matrix and an ion conducting polymer coating membrane formed in the outer surface of single fibers in the porous polymer matrix. The polymer electrolyte membrane can provide excellent mechanical strength, is not deteriorated by heat even at a temperature higher than 100°C., can provide excellent ion conductivity even at non-humidified state. Thus it is suitable for use in a fuel cell that is operated at high temperatures.

20 Claims, 3 Drawing Sheets

FOREIGN PATENT DOCUMENTS

| | | |
|---|---|---|
| JP | 2002-008680 | 1/2002 |
| JP | 2002-083514 | 3/2002 |
| JP | 2004-014232 | 1/2004 |
| JP | 2004-055165 | 2/2004 |
| JP | 2004-063430 | 2/2004 |
| JP | 2004-146279 | 5/2004 |
| JP | 2004-149779 | 5/2004 |
| JP | 2004-253336 | 9/2004 |
| KR | 10-2003-0038232 | 5/2003 |
| KR | 10-2004-0104842 | 12/2004 |
| WO | 01/60873 | 8/2001 |
| WO | 02/064268 | 8/2002 |

OTHER PUBLICATIONS

Japanese Office Action dated Jun. 23, 2009.
Office Action issued Sep. 11, 2009 by the State Intellectual Property Office of the People's Republic of China in Chinese Patent Application No. 2006100549688.
The Third Office Action issued Jan. 8, 2010 by the Patent Office of the People's Republic of China in Chinese Application No. 2006100549688.
Final Office Action of U.S. Appl. No. 11/363,241 dated on Jun. 10, 2010.
Notice of Allowance of U.S. Appl. No. 11/363,241 issued on Aug. 26, 2010.
Registration Determination Certificate for Chinese Patent No. 200510059038.7 issued on Aug. 6, 2008, corresponding to U.S. Appl. No. 11/363,241 and U.S. Appl. No. 11/150,183.
Registration Determination Certificate for Chinese Patent No. 200610054968 issued on Dec. 29, 2010, corresponding to U.S. Appl. No. 11/363,241 and U.S. Appl. No. 11/150,183.

* cited by examiner

POLYMER ELECTROLYTE MEMBRANE AND FUEL CELL EMPLOYING THE SAME

CROSS REFERENCE TO RELATED APPLICATION

This application claims priority to and benefit of Korean Patent Application No. 10-2004-0069091, filed on Aug. 31, 2004, in the Korean Intellectual Property Office, the disclosure of which is incorporated herein in its entirety by reference.

BACKGROUND OF THE INVENTION

1. Field of the Invention

The present invention relates to a polymer electrolyte membrane and a fuel cell that employs the same. In particular, the present invention relates to a polymer electrolyte membrane that has excellent thermal properties and mechanical stability, and a fuel cell employing the same.

2. Description of the Related Art

A fuel cell is a device that generates electricity by a chemical reaction between the fuel and oxygen. A fuel cell can be used to provide electric power in small electronic products such as portable devices, as well as to provide electric power for industrial, household and automotive use.

Fuel cells can be classified into categories based on the type of the electrolyte to be used, including polymer electrolyte membrane fuel cell (PEMFC), phosphoric acid fuel cell (PAFC), molten carbonate fuel cell (MCFC), and solid oxide fuel cell (SOFC), etc. The operating temperature of the fuel cell and the composition of its components vary depending on the type of electrolyte to be used.

Fuel cells can be classified based on the method of supplying fuel. These categories include an exterior reforming type that converts a fuel to a hydrogen enriched gas through a fuel reformer, a direct fuel feeding type that directly supplies a fuel in a gas or a liquid state to an anode, or an interior reforming type.

An example of the direct fuel feeding type is a direct methanol fuel cell (DMFC). In general, the DMFC uses an aqueous methanol solution as a fuel, and a hydrogen ion conducting polymer electrolyte membrane as an electrolyte. Accordingly, the DMFC is a type of PEMFC.

Although PEMFCs are small and lightweight, they can provide high output density. Furthermore, by using the PEMFC, a system for generating electricity becomes simple to construct.

A PEMFC typically comprises an anode (fuel electrode), a cathode (oxidant electrode), and a polymer electrolyte membrane placed between the anode and the cathode. The anode of the PEMFC is provided with a catalyst layer to promote oxidation of a fuel, and the cathode of the PEMFC is provided with a catalyst layer to promote reduction of the oxidant.

The fuel that is supplied to the anode of a PEMFC typically includes hydrogen, hydrogen-containing gas, mixed vapor of steam and methanol, and aqueous methanol solution, etc. The oxidant that is supplied to the cathode of the PEMFC typically includes oxygen, oxygen-containing gas or air.

A fuel is oxidized to form a hydrogen ion and an electron at the anode of the PEMFC. The hydrogen ion is transferred to the cathode through an electrolyte membrane, and the electron is transferred to an outer circuit (load) through a wire (or a collector). At the cathode of the PEMFC, the hydrogen ion transferred through the electrolyte membrane, the electron transferred from the outer circuit through a wire (or a collector), and oxygen are combined to form water. The flow of the electron through the anode, the outer circuit, and the cathode is electricity.

In the PEMFC, the polymer electrolyte membrane plays not only a role as an ion conductor to transfer hydrogen ions from the anode to cathode, but also a role as a separator to block the physical contact of the anode and the cathode. Accordingly, the properties required for the polymer electrolyte membrane are excellent ion conductivity, electrochemical stability, strong mechanical strength, thermal stability at operating temperature, easy thin film making, etc.

The material of the polymer electrolyte membrane generally includes a polymer electrolyte such as a sulfonate perfluorinated polymer such as Nafion® that has a backbone consisting of a fluorinated alkylene, and a side chain that consists of a fluorinated vinyl ether that has a sulfonic acid group at the terminal end. Such a polymer electrolyte membrane contains a sufficient quantity of water and thus shows excellent ion conductivity.

However, when operating a PEMFC at an operating temperature higher than 100° C., such an electrolyte membrane loses its function since its ion conductivity seriously declines due to the loss of water by evaporation. This problem makes it almost impossible to operate the PEMFC using such a polymer electrolyte membrane at atmospheric pressure and a temperature higher than 100° C. Thus, existing PEMFCs have been operated at a temperature lower than 100° C., for example at about 80° C.

Methods to increase the operating temperature of the PEMFC to a temperature of 100° C. or higher including mounting a humidifying apparatus on the PEMFC, operating the PEMFC at pressurized condition, and using a polymer electrolyte that does not require humidification have been suggested.

When the PEMFC is operated under pressurized conditions, the operating temperature can be elevated since the boiling point of water is elevated. For example, when the operating pressure of the PEMFC is 2 atm, the operating temperature can be elevated to about 120° C. However, when a pressurizing system is applied or a humidifying apparatus is mounted to the device, not only do the size and weight of the PEMFC increase, but the total efficiency of the generating system decreases. Accordingly, in order to maximize the application range of the PEMFC, the "non-humidified polymer electrolyte membrane" which is a polymer electrolyte membrane that provides excellent ion conductivity without humidification, is needed.

An example of a non-humidified polymer electrolyte membrane is disclosed in Japanese Patent Publication No. 1999-503262. In this patent, several materials, such as polybenzoimidazole, sulphuric acid or phosphoric acid doped polybenzoimidazole, etc. are described as a non-humidified polymer electrolyte.

SUMMARY OF THE INVENTION

The present invention provides a polymer electrolyte membrane that has stability at a high temperature, excellent mechanical strength, and excellent ion conductivity even at non-humidified state.

The present invention also provides a method of fabricating the same.

The present invention also provides a fuel cell that employs the polymer electrolyte membrane to improve cell performance.

Additional features of the invention will be set forth in the description which follows, and in part will be apparent from the description, or may be learned by practice of the invention.

The present invention discloses a polymer electrolyte membrane that includes a porous polymer matrix and an ion conducting polymer-coating membrane formed on the outer surface of single fibers comprising the porous polymer matrix.

The present invention also discloses a method of preparing a polymer electrolyte membrane that includes coating microparticles that comprise an ion conducting polymeric compound and a crosslinking agent on the porous polymer matrix. The next step involves polymerizing the resulting product to obtain a polymer electrolyte comprising an ion conducting polymer coating membrane formed on the outer surface of single fibers that comprise the porous polymer matrix.

The present invention also discloses a fuel cell including a cathode, an anode, and the polymer electrolyte membrane that is interposed between the cathode and the anode.

It is to be understood that both the foregoing general description and the following detailed description are exemplary and explanatory and are intended to provide further explanation of the invention as claimed.

BRIEF DESCRIPTION OF THE DRAWINGS

The above and other features and advantages of the present invention will become more apparent by describing in detail exemplary embodiments thereof with reference to the attached drawings.

DETAILED DESCRIPTION OF THE INVENTION

Figure 1:
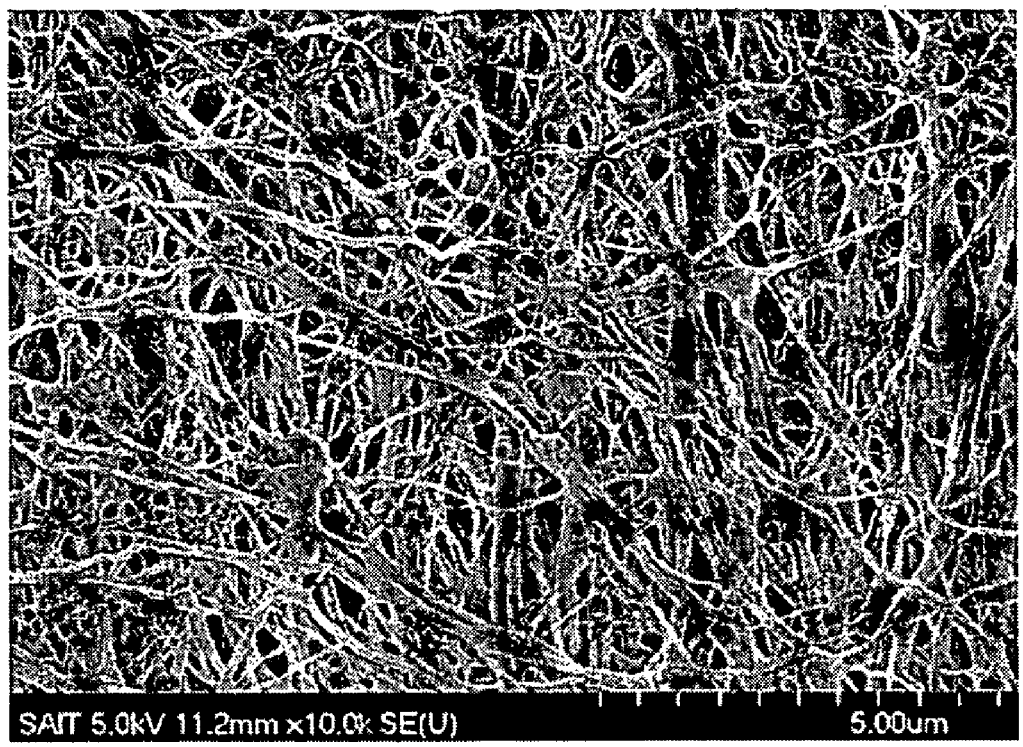
FIG. 1 is a scanning electron microscope (SEM) photograph of the PTFE matrix before coating a composition according to Example 1.

The polymer electrolyte membrane according to the present invention can provide an excellent mechanical strength, is not deteriorated by heat even at temperatures higher than 100° C., and can provide excellent ion conductivity even at non-humidified state. Thus this polymer electrolyte membrane is suitable for use in fuel cells that operate at high temperatures.

A polymer electrolyte membrane according to the present invention comprises an ion conducting polymer coating membrane and a polymer matrix and an ion conducting polymeric compound that are grafted or crosslinked on the outer surface of a single fiber (or individual fiber) that constitutes the polymer matrix. The polymer matrix has excellent mechanical strength and thermal stability at temperatures near 200° C., and the ion conducting polymeric compound includes various types of ion conducting groups, particularly, hydrogen ion conducting groups).

The term "polymer electrolyte membrane" herein refers to an ion conductor that comprises a polymer electrolyte matrix into which an ion medium is impregnated. The term "ion medium" refers to a monomer (Nafion®) comprising a sulfonic acid group that is to be coated in a direct methanol fuel cell and to phosphoric acid that fills in a phosphoric acid fuel cell.

The term "single fiber" herein refers to a single fiber that is in web form that has a porous interior and a three-dimensional structure in a porous polymer matrix. In other words, it refers to an individual fiber or a chain that constitutes a polymer matrix.

The ion-conducting polymer of the present invention is formed by polymerizing a composition that comprises an ion conducting polymeric compound and a crosslinking agent and the porous polymer matrix.

The ion conducting polymeric compound refers to a monomer or an oligomer that has ion conducting functional groups at its terminal end. These ion conducting functional groups may include but are not limited to acid groups, for example, a sulfonic acid group, a phosphoric acid group, a carboxylic acid group, an imide group, a sulfonimide group, a sulfonamide group and a hydroxyl group. At its head, the ion conducting polymeric compound may include a polymeric bond such as a double bond, or a functional group such as an epoxy group, etc.

The weight average molecular weight of such an ion conducting polymeric compound is less than about 10,000 g/mole, preferably 100 to 10,000 g/mole, and more preferably 100 to 2,000 g/mole. When the weight average molecular weight exceeds 10,000 g/mole, the conductivity of the compound deteriorates.

The ion conducting polymeric compound may include, but is not limited to an organic compound including a vinyl sulfonic acid, a styrene sulfonic acid, an acrylic compound (e.g., acrylic acid, methacrylic acid) and other strong acid.

The crosslinking agent improves the mechanical properties of the polymer electrolyte membrane by polymerizing the ion conducting polymeric compound and the porous polymer matrix. This crosslinking agent may be a hexyl acrylate, a butyl acrylate, a trimethylolpropane triacrylate (TMPTA), a poly(ethylene glycol)methacrylate (PEGMA) $\{H_2C=C(CH_3)-C(=O)-(OCH_2CH_2)_n-OH$, where n is an integer of 1 to 25$\}$, a poly(ethylene glycol)dimethacrylate (PEGDMA) $\{H_2C=C(CH_3)-C(=O)-(OCH_2CH_2)_n-OC(=O)-C(CH_3)=CH_2$, where n is an integer of 1 to 25$\}$, an allyl acrylate, a divinyl benzene, etc.

The concentration of the crosslinking agent can be 25 to 300 parts by weight based on 100 parts by weight of the ion conducting polymeric compound. When the concentration of the crosslinking agent is less than 25 parts by weight, the crosslinking effect is unsatisfactory. When the concentration of the crosslinking agent exceeds 300 parts by weight, the polymer is so excessively crosslinked that the migration of protons can be hindered, thus lowering the conductivity of the polymer electrolyte membrane.

The composition that comprises the ion conducting polymeric compound and a crosslinking agent may further comprise a plasticizer to increase the flexibility of the polymer electrolyte membrane. Examples of such a plasticizer may include but is not limited to a poly(ethylene glycol)methyl ether acrylate $\{CH_2=CH-C(=O)O-(CH_2CH_2O)_m-CH_3$, where m is an integer of 1 to 25$\}$, a polyallyl ether $\{CH_2=CH-(CH_2CH_2O)_m-CH_3$, where m is an integer of 1 to 25$\}$, etc.

The concentration of the plasticizer can be 0 to 200 parts by weight based on 100 parts by weight of the ion conducting polymeric compound. When the concentration of the plasticizer exceeds 200 parts by weight, the mechanical properties of the composition can deteriorate.

The porous polymer matrix that constitutes the polymer electrolyte membrane according to the present invention is a porous substrate made of at least one compound including, but not limited to a polytetrafluoroethylene (PTFE), a polyvinylidenefluoride (PVDF), a polypropylene (PP) and a polyethylene (PE). The thickness of the polymer matrix substrate ranges from 20 to 150 μm, and its porosity ranges from 30 to 90%. When the porosity is less than 30%, the amount of the coated ionomer can be decreased, and its conductivity can worsen. When the porosity exceeds 90%, the conductivity can improve, but the mechanical properties deteriorate.

A porous polymer matrix made of a PTFE is useful in a polymer electrolyte type fuel cell that is operated at high temperature. A hydrophobic porous polymer matrix made of a PVDF, PP, etc. is useful in a direct methanol fuel cell in which the methanol crossover is decreased.

The method of polymerization of the ion conducting polymeric compound and the porous polymer matrix may include, but is not limited to a high-energy irradiation method such as UV irradiation, gamma radiation, and E-beam radiation.

In the polymer electrolyte membrane according to the present invention, the thickness of the ion conducting polymer coating membrane formed on an outer surface of a single fiber may be 1 to 3 μm. Preferably, the thickness of the coating on both sides of membrane comprising the ion-conducting polymer formed on the outer surface of a single fiber is 1 to 3 μm. When the thickness of the coating membrane is less than 1 μm, the quantity of the coated ionomer may be insufficient, thus lowering the ion conductivity of the membrane. When the thickness exceeds 3 μm, the electrolyte membrane can block pores, thereby lowering the conductivity and causing poor physical properties.

Hereinafter, the method of preparing the polymer electrolyte membrane according to the present invention will be described in detail.

A microparticle coating is deposited on a porous polymer matrix using a composition comprising an ion conducting polymeric compound and a crosslinking agent. Such microparticle coating method is not particularly limited and may include chemical vapor deposition (CVD) and physical vapor deposition (PVD). The composition can be coated on only one side of the porous polymer matrix or it can be coated on both sides.

A coating method that employs flash evaporation will be given in more detail as follows.

A monomer is sublimed at a high temperature under ultra low pressure and is sprayed on a substrate to coat the surface and its pores. The thickness of the coated membrane is controlled by controlling the quantity of the mixed monomers. This coating method is disclosed in U.S. Pat. No. 6,468,595, the disclosure of which is incorporated herein for the reference. The present invention uses this coating method.

After coating the substrate with the microparticles as described above, the composition is polymerized to obtain a polymer electrolyte membrane in which a coating membrane made of an ion-conducting polymer is formed on the outer surface of single fibers in the porous polymer matrix. The microparticle coating method, although not particularly limited to any method, includes vacuum deposition.

The polymerization reaction can be achieved by applying light, heat, or an electron beam, as previously mentioned. UV radiation may be applied as the light treatment, and a temperature of 70 to 350° C. may be employed for the heat treatment. The polymerization reaction includes a crosslinking reaction of an ion conducting polymeric compound and a crosslinking agent and a grafting reaction, etc. which forms a corresponding ion conducting polymer. As described above, the composition can further comprise a plasticizer.

By providing a cathode, an anode, and the above-describe polymer electrolyte membrane interposed between the cathode and the anode, the fuel cell according to the present invention can be obtained.

The present invention will be described in more detail with reference to the following examples. The following examples are for illustrative purposes and are not intended to limit the scope of the invention.

EXAMPLE 1

Compositions of a sulfonyl acrylate ($CH_2\!=\!CH\!-\!C(\!=\!O)O\!-\!SO_3H$) and a PEGDA in the weight ratio described in Table 1 below were prepared, and were subjected to flash evaporation on a polyvinylidenefluoride (PVDF) matrix, a polytetrafluoroethylene (PTFE) matrix, or the Celgard matrix (polyethylene matrix), respectively. Then, they were irradiated with UV light for 10 minutes to perform polymerization reaction. Thus, the polymer electrolyte membranes in which the proton conducting polymers of a vinyl sulfonic acid and a PEGDA are coated on the single fibers in the polyvinylidenefluoride matrix were completed.

An EFCG-S type (E-TEK Company), electrode with a loading of 0.6 mg/cm$^2$, on which 10 wt % platinum is supported on Toray carbon paper TGPH900, was used as an electrode. In order to impregnate the electrode with a phosphoric acid, the electrode was soaked with in phosphoric acid at 120° C. for 1 hour under vacuum.

A fuel cell comprising the electrode and the above described polymer electrolyte membrane was assembled.

TABLE 1

| No | Sulfonyl acrylate (parts by weight) | PEGDA (parts by weight) |
|---|---|---|
| 1 | 100 | 0 |
| 2 | 80 | 20 |
| 3 | 50 | 50 |
| 4 | 30 | 70 |

Figure 2:
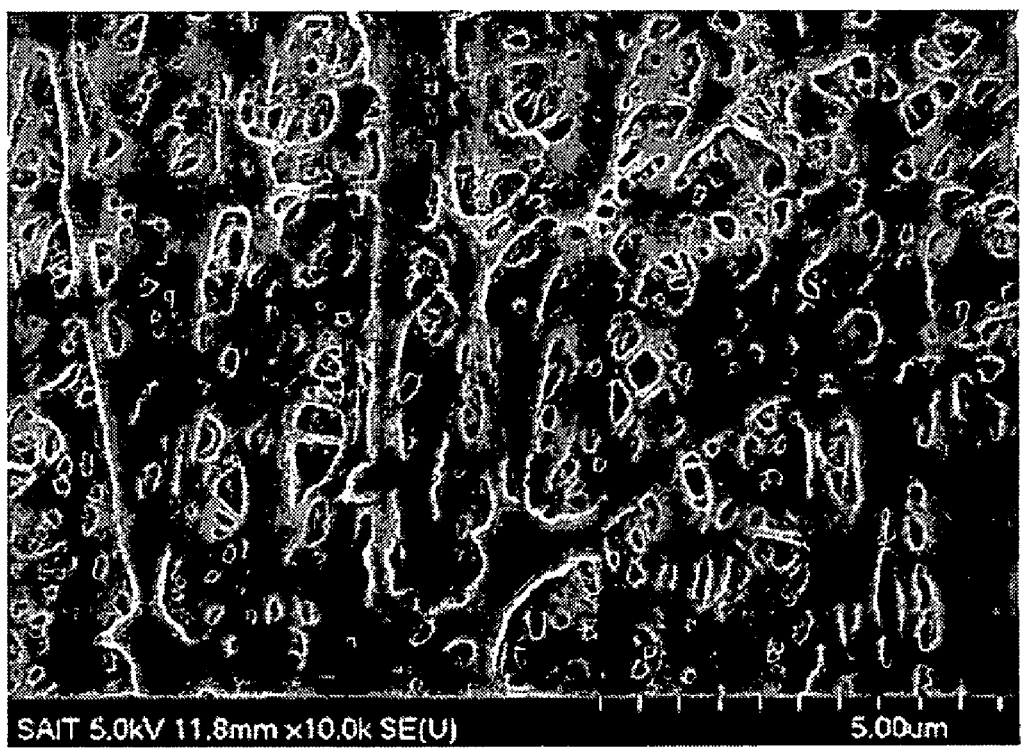
FIG. 2 is a SEM photograph of a polymer electrolyte membrane in which an ion conducting polymer-containing coating membrane is formed on the outer surface of a single fiber constituting a PTFE matrix according to Example 1.
Figure 3:
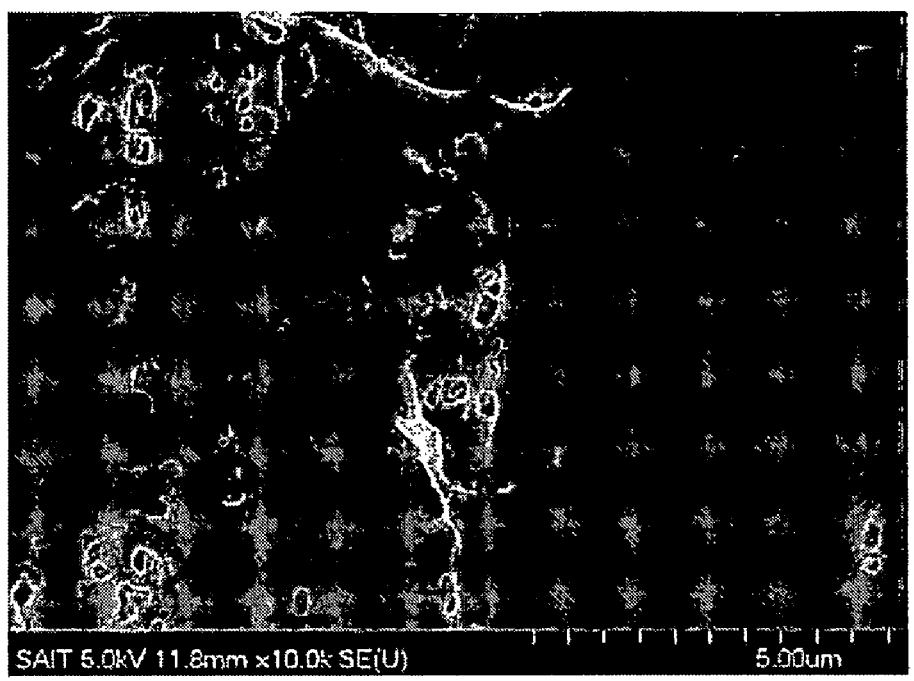
FIG. 3 is a SEM photograph that shows the state of which the polymer electrolyte membrane of FIG. 2 when it is swollen by a phosphoric acid.

FIG. 1 is an SEM photograph (10,000× magnification) of the PTFE matrix before coating a composition according to Example 1. FIG. 2 shows an SEM photograph (10,000× magnification) of a polymer electrolyte membrane in which an ion conducting polymer-containing coating membrane is formed on the outer surface of a single fiber constituting a PTFE matrix, by coating a composition that comprises 30 parts by weight of a sulfonyl acrylate and 70 parts by weight of a PEGDA according to Example 1. FIG. 3 is an SEM photograph that shows the polymer electrolyte membrane of FIG. 2 when it is swollen with phosphoric acid.

Comparing FIG. 1 and FIG. 2, it was found that the coating membrane was formed to a thickness of about 1 μm in order to sterically surround the circumference of the single fiber constituting the PTFE matrix. Further, FIG. 1 and FIG. 2 confirm that the coating is performed on each fiber of the polymer by coating the polymer on the porous polymer matrix and that the pores are present even after coating. Accordingly, the polymer coating provides a medium through which the coated ionomer is swollen to ensure a path for migration of protons since the polymer is coated on threedimensions, even on the interior of the polymer membrane, is and not simply on the surface. However, the polymer coating can also provide the effect of preventing blocking gases.

Referring to FIG. 3, it was found that the swollen electrolyte membrane could effectively fill the existing pores due to the swelling of the polymer to form a polymer membrane in pinhole-free state.

Figure 4:
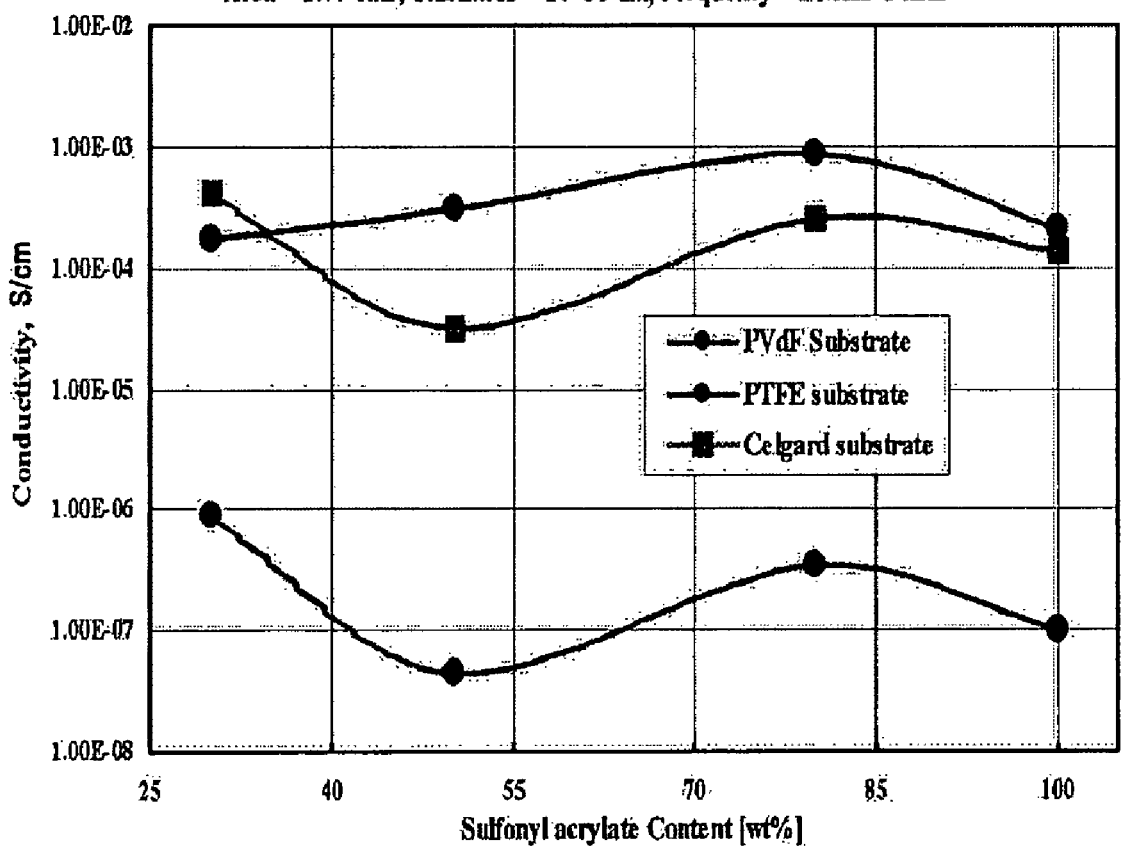
FIG. 4 is a graph that shows the variation in ion conductivity depending on the quantity of the sulfonyl acrylate for the polymer electrolyte membrane obtained according to Example 1.

The variation in the ion conductivity depending on the content of the sulfonyl acrylate was examined for the polymer electrolyte membrane obtained according to Example 1, and the results are shown in FIG. 4. The membrane was impregnated in 85% phosphoric acid for 1 hour at a room temperature in order to measure the ion conductivity of the polymer electrolyte membrane.

Referring to FIG. 4, it was found that the PTFE matrix provided the polymer electrolyte membrane with the highest ion conductivity.

Further, the cell performance for a fuel cell prepared according to Example 1 (using the PTFE matrix as a substrate) was examined. In these tests, the flow rate of hydrogen gas was about 100 ml/min, the flow rate of air was about 300 ml/min, and the variation in the electric potentials of the cell depending on the electric current density was examined under non-humidified conditions.

The results of the cell performance tests described above are shown in FIG. 5.

Figure 5:
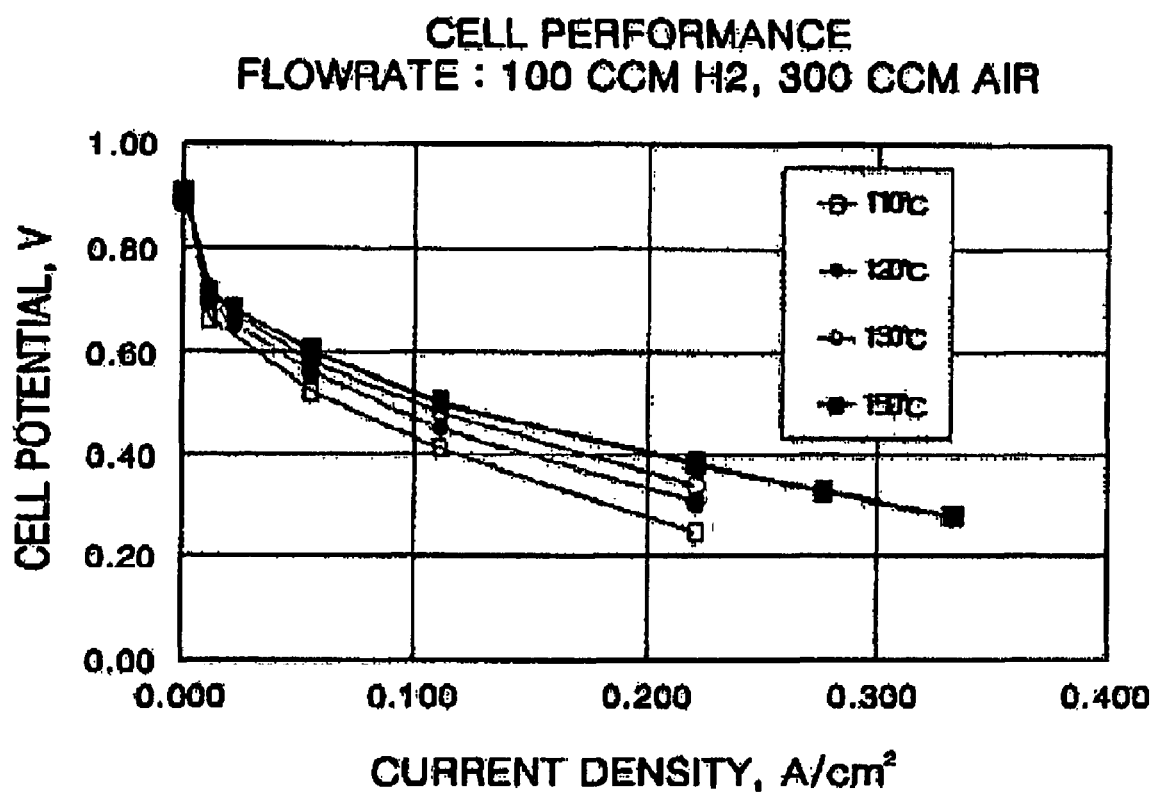
FIG. 5 is a graph that shows the cell performance for the fuel cell prepared according to Example 1 of the present invention.

Referring to FIG. 5, the voltage per temperature at an electric current density of 0.2 A/cm$^2$ was measured to find that the highest voltage, 0.4V, occurred at 150° C. and declined as temperature was lowered. This indicates that as temperature rises, the segmental motion of the existing polymer is increasingly active, and simultaneous migration of protons is facilitated.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A polymer electrolyte membrane, comprising:
   a porous polymer matrix; and
   a polymer coating that conducts ions, the polymer coating formed on the outer face of a single fiber in the porous polymer matrix,
   wherein the polymer coating is obtained by polymerizing an ion conducting polymeric compound using a crosslinking agent, wherein the polymer electrolyte membrane is obtained by vacuum deposition of a micro particle coating of the ion conducting polymer on individual fibers of a porous polymer matrix to obtain a polymer electrolyte wherein the membrane sterically surrounds the circumference of the individual fibers in the polymer matrix,
   wherein pores of the polymer electrolyte membrane are present after coating,
   wherein the ion conducting polymeric compound is a sulfonyl acrylate, a monomer, or an oligomer, and
   wherein the monomer and the oligomer comprise at least one functional group selected from a group consisting of an imide group, a sulfonimide group, a sulfonamide group, and a hydroxyl group at its terminal end.

2. The polymer electrolyte membrane of claim 1, wherein the monomer and the oligomer further comprise
   an unsaturated bond at its head,
   wherein the ion conducting polymeric compound has a weight average molecular weight of less than 10,000 g/mole.

3. The polymer electrolyte membrane of claim 1,
   wherein the crosslinking agent is at least one selected from a group consisting of a hexyl acrylate, a butyl acrylate, a trimethylolpropane triacrylate, a poly(ethylene glycol) methacrylate, a poly(ethylene glycol)dimethacrylate, an allyl acrylate and a divinyl benzene.

4. The polymer electrolyte membrane of claim 1,
   wherein the ion conducting polymeric compound and the crosslinking agent are microparticles.

5. The polymer electrolyte membrane of claim 1,
   wherein the polymer coating further comprises a plasticizer.

6. The polymer electrolyte membrane of claim 5,
   wherein the plasticizer comprises at least one selected from a group consisting of a poly(ethylene glycol)methyl ether acrylate and a polyallyl ether.

7. The polymer electrolyte membrane of claim 1,
   wherein the porous polymer matrix is a porous substrate made of at least one selected from a group consisting of a polytetrafluoroethylene, a polyvinylidenefluoride, a polypropylene and a polyethylene.

8. The polymer electrolyte membrane of claim 1,
   wherein the porous polymer matrix is between about 10 μm to about 150 μm thick, and has a porosity between about 30% to about 90%.

9. The polymer electrolyte membrane of claim 1,
   wherein the polymer coating is coated on a fiber of the porous polymer matrix from about 1 μm to about 3 μm thick.

10. A fuel cell, comprising:
    a cathode;
    an anode; and
    a polymer electrolyte membrane,
    wherein the polymer electrolyte membrane comprises a porous polymer matrix and a polymer coating that conducts ions, the polymer coating formed in the outer face of a single fiber in the porous polymer matrix,
    wherein the polymer coating is obtained by polymerizing an ion conducting polymeric compound using a crosslinking agent,
    wherein the polymer electrolyte membrane is obtained by vacuum deposition of a micro particle coating of the ion conducting polymer on individual fibers of a porous polymer matrix to obtain a polymer electrolyte wherein the membrane sterically surrounds the circumference of the individual fibers in the polymer matrix,
    wherein pores of the polymer electrolyte membrane are present after coating,
    wherein the ion conducting polymeric compound is a sulfonyl acrylate, a monomer, or an oligomer, and
    wherein the monomer and the oligomer comprise at least one functional group selected from a group consisting of an imide group, a sulfonimide group, a sulfonamide group, and a hydroxyl group at its terminal end.

11. The fuel cell of claim 10, wherein the monomer and the oligomer further comprise
    an unsaturated bond at its head,
    wherein the ion conducting polymeric compound has a weight average molecular weight of less than 10,000 g/mole.

12. The fuel cell of claim 10,
    wherein the crosslinking agent is at least one selected from a group consisting of a hexyl acrylate, a butyl acrylate, a trimethylolpropane triacrylate, a poly(ethylene glycol)

methacrylate, a poly(ethylene glycol)dimethacrylate, an allyl acrylate and a divinyl benzene.

13. The fuel cell of claim 10,
wherein the ion conducting polymeric compound and the crosslinking agent are microparticles.

14. The fuel cell of claim 10,
wherein the polymer coating further comprises a plasticizer.

15. The fuel cell of claim 14,
wherein the plasticizer comprises at least one selected from a group consisting of a poly(ethylene glycol)methyl ether acrylate and a polyallyl ether.

16. The fuel cell of claim 10,
wherein the porous polymer matrix is a porous substrate made of at least one selected from a group consisting of a polytetrafluoroethylene, a polyvinylidenefluoride, a polypropylene and a polyethylene.

17. The fuel cell of claim 10,
wherein the porous polymer matrix is between about 10 to about 150 μm thick, and has a porosity between about 30% to about 90%.

18. The fuel cell of claim 10,
wherein the polymer coating is coated on a fiber of the porous polymer matrix from about 1 to about 3 μm thick.

19. A polymer electrolyte membrane, comprising:
a porous polymer matrix; and
a polymer coating that conducts ions, the polymer coating formed on the outer face of a single fiber in the porous polymer matrix, wherein the polymer coating is obtained by polymerizing an ion conducting polymeric compound using a crosslinking agent, wherein the pores of the polymer electrolyte membrane are present after coating,
wherein the polymer coating is coated on a fiber of the porous polymer matrix from about 1 μm to about 3 μm thick,
wherein the ion conducting polymeric compound is a sulfonyl acrylate, a monomer, or an oligomer, and
wherein the monomer and the oligomer comprise at least one functional group selected from a group consisting of an imide group, a sulfonimide group, a sulfonamide group, and a hydroxyl group at its terminal end.

20. A fuel cell, comprising:
a cathode;
an anode; and
a polymer electrolyte membrane,
wherein the polymer electrolyte membrane comprises a porous polymer matrix and a polymer coating that conducts ions, the polymer coating formed in the outer face of a single fiber in the porous polymer matrix, wherein the polymer coating is obtained by polymerizing an ion conducting polymeric compound using a crosslinking agent, wherein the pores of the polymer electrolyte membrane are present after coating,
wherein the polymer coating is coated on a fiber of the porous polymer matrix from about 1 μm to about 3 μm thick,
wherein the ion conducting polymeric compound is a sulfonyl acrylate, a monomer, or an oliqomer, and
wherein the monomer and the oligomer comprise at least one functional group selected from a group consisting of an imide group, a sulfonimide group, a sulfonamide group, and a hydroxyl group at its terminal end.

\* \* \* \* \*